UNITED STATES PATENT OFFICE.

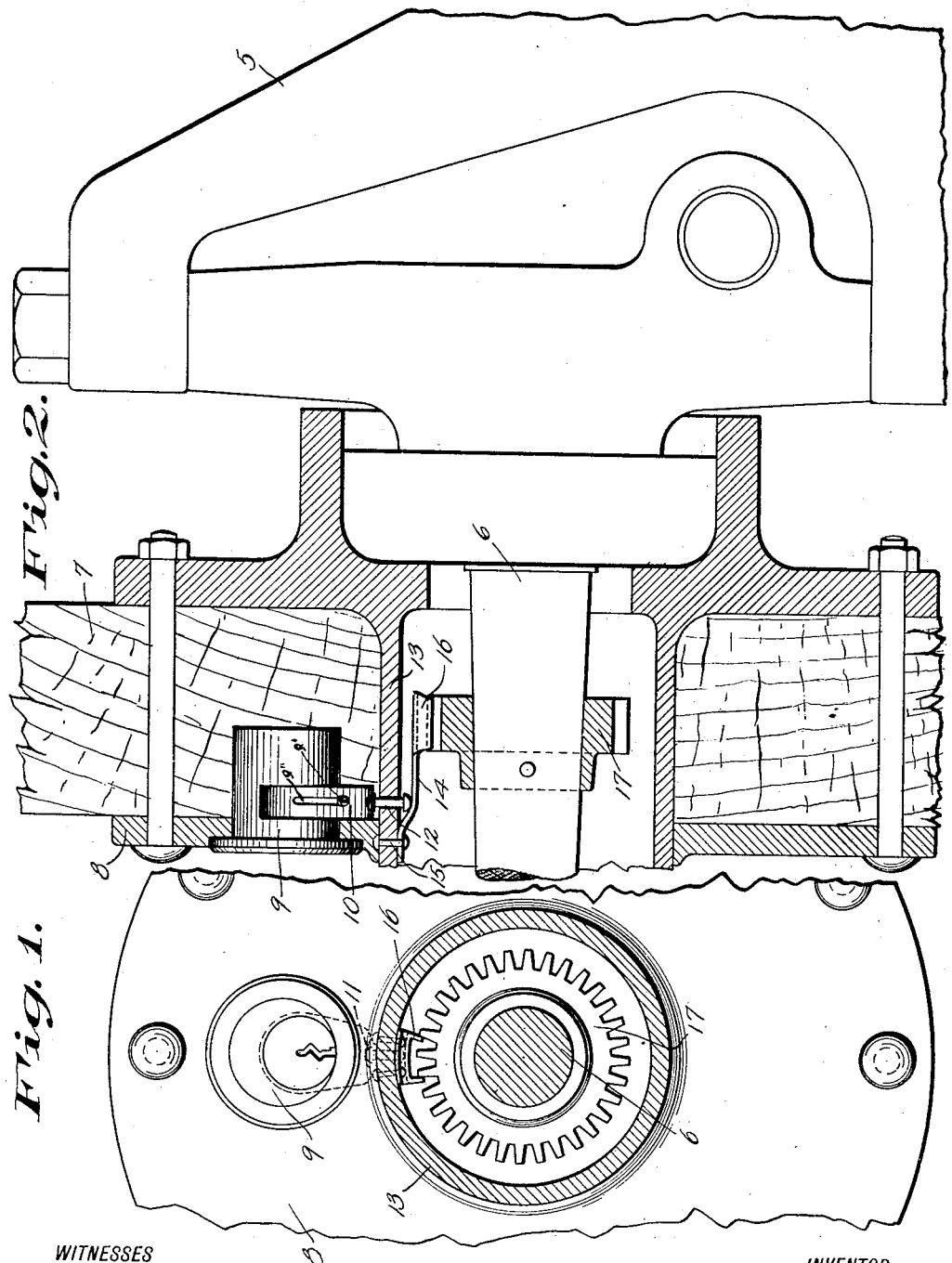

CHARLES EDWARD MULLER, OF NEW YORK, N. Y.

ALARM.

1,371,183.  Specification of Letters Patent.  Patented Mar. 8, 1921.

Application filed April 17, 1920. Serial No. 374,666.

*To all whom it may concern:*

Be it known that I, CHARLES E. MULLER, a citizen of the United States, and a resident of the city of New York, borough of Manhattan, in the county and State of New York, have invented a new and Improved Alarm, of which the following is a full, clear, and exact description.

In connection with vehicles, and more particularly automotive vehicles, it is well appreciated that a great number of the same are stolen every year.

With this in view, numerous constructions have been proposed, which provide for a locking medium rendering the vehicle incapable of movement upon the driver leaving the same.

These constructions have for the most part proven impractical in that laws are being enacted which forbid the leaving of a vehicle in any public place in a condition so that it may not be moved.

Further constructions have been proposed by means of which an alarm will be actuated upon the vehicle being moved.

These constructions have proven impractical for the most part in that certain of the same were entirely too cumbersome, others too complicated, still others too expensive to manufacture, quite a number further requiring such delicate adjustment that they would become inoperative upon being subjected to rough usage.

With this in view, I have constructed an alarm particularly applicable for use in connection with automotive vehicles, but which alarm might be adapted for a number of different uses, and which seeks to overcome the defects aforementioned.

An object of my invention is the construction of an alarm which shall be entirely accessible to the operator of the vehicle for the purpose of "setting" or "releasing".

Further objects of my invention are the construction of an alarm which shall be extremely simple in its parts, economical in manufacture, rugged in construction, and readily accessible.

Reference is had to the attached sheet of drawings illustrating one practical embodiment of my invention, and in which drawings, Figure 1 is a front view of the hub cap of a wheel having associated with it my improved type of alarm, and Fig. 2 is a sectional end view taken through a wheel showing my invention applied thereto.

In these views the reference numeral 5 indicates the axle fork of a vehicle carrying the conventional spindle 6, which in the usual manner, mounts the wheel. The latter is conventional in construction, including a body portion 7, and having attached to it the conventional hub flange 8.

Contrary to the usual construction, the hub flange 8 is provided with an opening overlying a recessed portion of the body 7 of the wheel, which opening and recessed portion conveniently receive a lock 9 of any convenient construction.

The lock 9 is conveniently provided with a pin 9' adapted to be swung upon the key being rotated. This pin conveniently extends through a longitudinal slot 9" formed in the latch, which latter includes an eccentrically mounted member 10 having a notched portion 11 in its outer face. A slidable headed pin 12 directly underlies the latch 10 and projects through an opening in the spindle housing 13 for a purpose hereinafter more fully specified.

Within the spindle housing 13 is a spring 14 having one of its ends secured to the housing as has been indicated at 15, its opposite end terminating in a double flange portion 16, as has been clearly shown, in Figs. 1 and 2.

A sprocket gear 17 of any desirable character is secured to the spindle 6, the teeth of the same occupying the same plane as that into which the double flange portion projects when in depressed position.

It will now be appreciated that the eccentric latch 10 is normally swung upward to a position at which it does not contact with the headed pin 12, thus permitting the spring 14 to raise the double flange portion 16 of the same to a plane exterior of that into which the teeth of the sprocket gear 17 project. The wheel may now freely be turned without any interference on the part of my alarm.

Further the latch 10, upon leaving the car, is turned to the position shown in Figs. 1 and 2, at which point the notched portion 11 of the same co-acts with the headed pin 12 to depress the latter, and to hold the same in this position. This connection results in the spring 14 being depressed so that the flange portion 16 of the same is engaged by the teeth of the sprocket gear 17. Thus upon the wheel rotating the outer end of the spring 14 and the sprocket gear will coöperate to produce a rattling noise which will immediately attract the attention of any person whom the vehicle passes.

Further, it will be appreciated from the above that I have constructed an alarm which will entirely comply with all laws, in that the vehicle is not prevented from moving, but by virtue of the positioning of the alarm and its simple construction, it will be impossible to move the vehicle without operating the signal.

It will further be seen that I have constructed an alarm which may be manufactured with extreme economy, and which may be operated with extreme ease in that the same is readily accessible and comprises no complicated mechanism, and it will be appreciated by virtue of the slot 9'' and pin 9' that the key will always be turned to that position at which it may be withdrawn irrespective as to whether the latch has been swung to the locked or unlocked position.

Obviously numerous modifications of structure might be resorted to without in the least departing from the scope of my claim, which reads—

What I claim as new and desire to secure by Letters Patent is as follows:—

An alarm, including in combination with the wheel and hub spindle of a vehicle, a lock attached to said wheel, an eccentrically mounted latch forming a part of said lock, a slidably headed pin positioned in line with said latch and adapted to be engaged thereby, a spring, having one of its ends secured to said wheel hub, and being formed at its opposite end with a double flange, a sprocket gear secured to the hub spindle and underlying the flanged end of said spring, whereby upon the latch being rotated the pin will be depressed to cause a depression on the part of said flanged end to move the same into engagement with the sprocket gear whereby the alarm is sounded.

CHARLES EDWARD MULLER.